US006065349A

United States Patent [19]

Edouard et al.

[11] Patent Number: 6,065,349

[45] Date of Patent: May 23, 2000

[54] PRESTRESSED ANNULAR ACOUSTIC TRANSDUCER

[75] Inventors: Marc Edouard, Nice; Bernard Loubieres, La Colle S/Loup; Pascal Bocquillon, Vallauris; Olivier Lacour, Plan de Grasse, all of France

[73] Assignee: Thomson-CSF, Paris, France

[21] Appl. No.: 08/860,223

[22] PCT Filed: Dec. 15, 1995

[86] PCT No.: PCT/FR95/01676

§ 371 Date: Jun. 23, 1997

§ 102(e) Date: Jun. 23, 1997

[87] PCT Pub. No.: WO96/20046

PCT Pub. Date: Jul. 4, 1996

[30] Foreign Application Priority Data

Dec. 23, 1994 [FR] France .................................. 94 15587

[51] Int. Cl.[7] .................................................. G01F 1/20

[52] U.S. Cl. .................................................. 73/861.18

[58] Field of Search ........................................... 73/861.18

[56] References Cited

U.S. PATENT DOCUMENTS 3,043,967 7/1962 Clearwaters ............................ 310/8.7

3,230,505 1/1966 Parker et al. ............................ 340/10

4,313,510 2/1982 Tomlison ................................ 177/165

4,546,459 10/1985 Congdon ................................ 367/155

*Primary Examiner*—Ronald Biegel

*Assistant Examiner*—Jewel V. Thompson

*Attorney, Agent, or Firm*—Oblon, Spivak, McClelland, Maier & Neustadt, P.C.

[57] ABSTRACT

The invention relates to annular acoustic transducers formed by a set of piezoelectric segments placed under prestress.

It consists in grouping these segments (101) into a set of sectors (102) which are separated by tightening wedges (109). The set is placed in a shaper annulus (108). The keys are drawn towards the center by screws (111), thus thrusting the sectors against the shaper annulus and prestressing the segments. The strain gauges (107) make it possible to check the stress obtained in order to adjust it to the desired value while minimizing the scatter between the sectors.

It makes it possible to manufacture dismantleable low-frequency high-power acoustic transducers.

15 Claims, 1 Drawing Sheet

PRESTRESSED ANNULAR ACOUSTIC TRANSDUCER

BACKGROUND OF THE INVENTION

1. Field of the Invention the present invention relates to piezoelectric transducers taking the form of an annulus and which are fitted with means making it possible to prestress this annulus so as to apply a stress of specified value thereto. It also relates to the processes which make it possible to implement these means for applying the said prestress to the annulus.

2. Discussion of the Background

Use is frequently made in underwater acoustics of piezoelectric transducers which make it possible to obtain acoustic waves, more particularly low-frequency acoustic waves, on the basis of an electrical excitation signal. A particular form of such a transducer, more especially suited to the emission of low-frequency waves, is that of a torus of rectangular cross-section, formed by a set of ceramic segments polarized head-to-tail and assembled by adhesive bonding with the interposition of an electrode between each segment. The segments thus excited contract and expand in tempo with the electrical signals which are applied by the electrodes, and this tangential motion of the segments translates into a radial extension and contraction of the annulus. This motion therefore gives rise to the production of acoustic waves which are emitted with radial symmetry about the axis of the annulus into the medium, generally the sea, in which the transducer is immersed.

To obtain sizeable acoustic power, the annuli are subjected to piezoelectric stresses of high amplitude and this effect is all the more marked the lower the frequency of the acoustic waves to be emitted. Under the effect of these stresses, the annulus would tend to break up, initially at the interfaces between the various segments and subsequently by straightforward rupture of the piezoelectric ceramics above a certain emission level. To alleviate this drawback it is expedient to prestress the annulus by compressing it with the aid of means which apply radial forces thereto, directed towards the centre and distributed uniformly over the outside surface of the annulus. These radial stresses induce tangential stresses which tend to hold the segments together securely and oppose the development within the ceramics of tensile stresses to which this type of material is known to be particularly brittle.

Various kinds of devices have been envisaged to obtain such stresses. These methods generally consist in winding a strap of an appropriate material around the annulus while pulling very hard on the ends of this strap so as to obtain a suitable hooping. Examples of these methods will be found for example in French Patents No. 2 346 862 and 2 463 979.

The methods thus used nevertheless have various drawbacks.

In particular the final value of the prestress thus obtained fluctuates within wide limits in an uncontrollable manner. These conditions, and since the system is neither dismantleable nor adjustable, lead to the scrapping of the annulus during construction while it is at a very advanced stage in its manufacture, thus giving rise to a considerable loss.

Moreover, given the various means making it possible to pull on the strap, as well as the friction of the latter on the surface of the segments, the stresses which are thus generated are not distributed uniformly and they are generally concentrated at a particular point corresponding to the stack of ribs. Such unevenness is a source of considerable hindrance, given the radial isotropy which it is sought to obtain for the acoustic radiation.

Furthermore these drawbacks are all the more considerable the larger the diameter of the annulus. Now, the diameter of the annulus is directly related to the desired frequency of emission. The lower the desired frequency the larger the annulus must be, and since in this case the larger the emission power desired the greater is the need for the prestress, and hence the more important become the drawbacks mentioned above.

SUMMARY OF THE INVENTION

To alleviate these drawbacks, the invention proposes a prestressed annular acoustic transducer, of the type comprising a set of piezoelectric segments arranged in the form of an annulus, principally characterized in that its segments are grouped to form substantially identical sectors, and in that it furthermore comprises end pieces fixed to the ends of these sectors in order to delimit wedge-shaped gaps between them, the narrower end of the wedge pointing towards the inside of the annulus, wedge-shaped tightening keys matched to these gaps and placed in them, a shaper annulus making it possible to hold the set of sectors, and tightening means allowing the tightening keys to be made to slide towards the inside of the annulus in order to prestress the segments by the shaper annulus.

According to another characteristic, the transducer furthermore comprises strain gauges fixed to the inside face of the sectors to allow measurement of the stresses applied to the segments.

According to another characteristic, the tightening means are formed by screws fixed in holes made in the inner face of the tightening keys and fitted with washers which bear on the end pieces of the sectors so as to allow a tension to be exerted on the keys when the screws are screwed.

According to another characteristic, the gaps remaining on the one hand between the tightening keys and the shaper annulus and on the other hand between these same tightening keys and the tightening means are plugged with a filler product when adjustment is effected.

According to another characteristic, the dynamic stiffness of the shaper annulus is substantially ten times smaller than that of the piezoelectric segments.

The invention furthermore proposes a process for adjusting such a transducer principally characterized in that the tightening means are progressively tightened while monitoring the readings given by the strain gauges so as to obtain identical stresses equal to the desired value on each sector.

BRIEF DESCRIPTION OF THE DRAWINGS

Other features and advantages of the invention will emerge clearly in the following description given by way of non-limiting example with regard to the appended figures which represent.

DESCRIPTION OF THE PREFERRED EMBODIMENT

Figure 1:
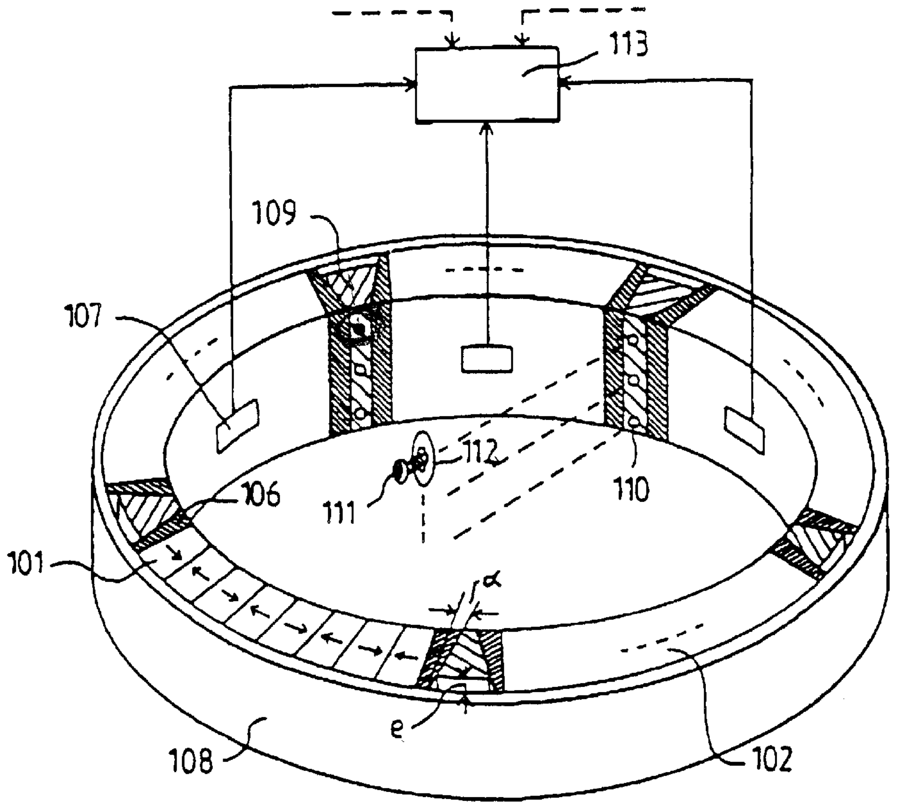
FIG. 1, an isometric perspective view of an annular transducer according to the invention.

In the example embodiment represented in FIG. 1, the piezoelectric annulus forming the transducer is made by assembling a set of elementary segments 101 having the shape of prisms of trapezoidal cross-section entirely similar to those used in the prior art.

However, according to the invention, the annulus is divided into a set of substantially identical sectors 102 joining together subsets of segments. By way of example, in a practical embodiment the diameter of the annulus is of the order of 20 cm and it is divided into 5 sectors each including 8 segments.

Figure 3:
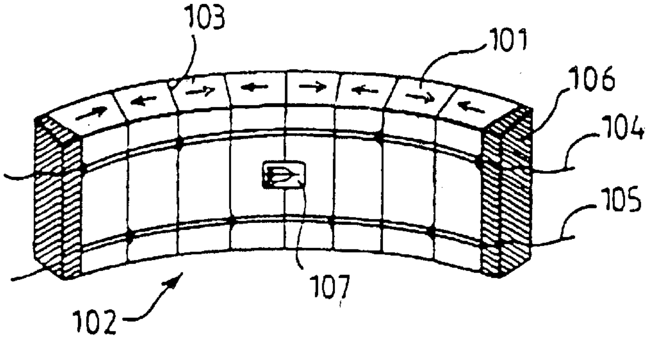
FIG. 3, an isometric perspective view of a sector of the annulus lying between two wedges such as those of FIG. 2.

Represented in FIG. 3 is one of these sectors in isolation. It is formed of 8 elementary segments 101 made of piezoelectric ceramic, PZT for example. These segments are adhesively bonded together with the interposition of electrodes 103 which allow the application of the electrical excitation voltages. According to a known technique, the segments are tangentially polarized alternately in opposite directions. The electrodes 103 are joined alternately to connections 104 and 105 which enable these electrical voltages to be applied to the electrodes.

Furthermore the ends of the sector are fitted with metal pieces adhesively bonded to the outside faces of the endmost segments. These metal pieces are wedge-shaped and their outside lateral faces make an angle $\alpha$ with the direction of the radius of the annulus, as represented in FIG. 1. This angle a is such that the width of the wedge is greater over the inside surface of the annulus than over its outside surface.

Moreover, at least one strain gauge 107 is furthermore arranged on the inside face of the sector, this making it possible to measure the stresses applied to the sectors at this inside face. This strain gauge is for example made in the known form of a film supporting metal electrodes arranged in such a way that the extension or contraction of the surface on which the gauge is adhesively bonded causes a variation in the resistance of these electrodes according to a known law.

The set of 5 sectors is arranged inside a shaper annulus 108 which makes it possible to define the shape and the dimensions of the piezoelectric annulus. This annulus is for example manufactured from epoxy glass with a carefully polished inside surface.

Figure 2:
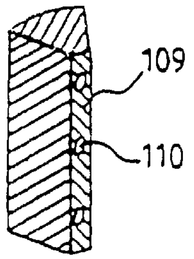
FIG. 2, an isometric perspective view of a wedge for adjusting this annulus.

The dimensions of the sectors are contrived so that a clearance remains between the metal pieces of the ends of two adjacent sectors. Adjuster keys having the shape of wedges 109 fill this clearance. These keys, an example of which is represented in FIG. 2, are therefore placed between the sectors and enable these sectors to be locked inside the shaper annulus 108. The angle between the two lateral faces of these keys is designed to correspond to the angle alpha of the end pieces of the sectors, so that when the keys are in position these outside faces are applied to the outside faces of these end pieces with as small an angular clearance as possible, so as to avoid excessive stresses at the points of contact between the keys and the end pieces.

To carry out assembly of the set, the faces of the keys 109 oriented towards the inside of the annulus are furnished with tapped holes 110, here 3 in number, which make it possible to receive tightening members which are screwed into these holes while bearing on the faces of the end pieces 106 themselves oriented towards the inside of the annulus. These tightening pieces may be more or less complicated, but in the example embodiment represented they are composed of screws 111 on which washers 112 are threaded. These screws are screwed into the tapped holes, then onto the washers, themselves bearing on the pieces 106. A tension is thus exerted on the wedge-shaped keys 109 towards the inside of the annulus and this tends, given the angles $\alpha$, to part the sectors 101 and to enlarge the annulus formed by the set of these sectors and keys. Under this widening effect the piezoelectric annulus is brought to bear firmly on the inside of the shaper annulus 108, thereby, firstly, holding the set of pieces in position.

The assembly thus obtained having been checked, it is possible, secondly, to undertake the prestressing thereof by tightening the screws more strongly. Under this effect, the adjuster keys 109 progress towards the center of the annulus while increasing the parting e between them and the shaper annulus and therefore increasing the pressure load of the sectors on the shaper annulus. By reaction this gives rise to a prestressing of these sectors by this shaper annulus. Tightening is carried out in the conventional manner by progressively tightening the screws in a cross sequence until the required prestress is obtained.

To ensure the value and uniformity of the prestress, the invention proposes to use the strain gauges 107 described earlier. For this purpose, the latter will be linked to measurement means 113 which make it possible to determine the stress at these gauges. The stress at the locations or [sic] these gauges are placed indicates, to within a known multiplier coefficient, the overall stress applied to the ceramics forming each sector. The sectors are sufficiently small for the stresses thus obtained and measured to be uniformly distributed. In the case of a larger annulus, it would perhaps be expedient to use a greater number of sectors. Of course, the tightening of the screws will be carried out progressively while continuously checking the change in the stresses, so as to obtain the desired overall stress and to minimize as far as possible the discrepancies between the stresses which is [sic] measured locally.

When finalized adjustment is obtained, the gap e between the keys 109 and the shaper annulus 108 can perhaps be filled as can any residual gap between the tightening means and these same keys, with a filler material. This filler material will preferably be relatively elastic, polyurethane for example, so as to be able to allow possible subsequent fine-tuning.

Of course the shaper annulus 108 affects the acoustic characteristics of the transducer thus constructed, as is anyway the case in the other already known prestressing systems. It has been determined that in order to obtain correct results, in particular which do not excessively disturb the operation of the piezoelectric annulus, it was preferable to use a shaper annulus whose dynamic stiffness is around ten times smaller than that of the piezoelectric annulus made of ceramics.

As compared with the known systems for prestressing, this device is particularly easy to implement and hence inexpensive. Furthermore, it is modular and this makes it possible, as the case may be, to replace just a single segment in the event of a fault therein. The stresses are distributed in a remarkably uniform manner, and their variations over time is [sic] very small. It is entirely possible to fine-tune this prestress, either as a function of the operational conditions, or in order to correct drifting over time. Moreover the assembly is dismantleable, thus allowing the repairs mentioned earlier. Lastly, the metal pieces 106 and 109 promote, as the case may be, heat sinkage, especially when the annulus is loaded with very high electrical powers.

We claim:

1. A prestressed annular acoustic transducer, comprising:

a set of piezoelectric segments arranged in the form of an annulus, the piezoelectric segments being grouped to form substantially identical sectors;

end pieces fixed to end of at least selected of the sectors to delimit wedge-shaped gaps between the selected sectors, the narrower ends of the wedge-shaped gaps pointing towards the inside of the annulus;

wedge-shaped tightening keys matched to the wedge-shaped gaps and placed in wedge-shaped gaps;

a shaper annulus holding the sectors and end pieces; and a tightening mechanism configured to slide the tightening keys towards the inside of the annulus to prestress the segments.

2. The transducer according to claim 1, further comprising:

strain gauges fixed to an inside face of the sectors to allow measurement of the tangential stresses applied to the segments.

3. The transducer according to claim 1, wherein the tightening mechanism is formed by screws fixed in holes made in an inner face of the tightening keys and fitted with washers which bear on the end pieces of the sectors so as to allow a tension to be exerted on the keys when the screws are screwed.

4. The transducer according to claim 1, wherein gaps remaining between the tightening keys and the shaper annulus and gaps remaining between the tightening keys and the tightening mechanism are plugged with a filler product.

5. The transducer according to claim 1, wherein the dynamic stiffness of the shaper annulus is substantially ten times smaller than that of the piezoelectric segments.

6. The transducer according to claim 2, wherein the tightening mechanism comprises screws fixed in holes made in the inner face of the tightening keys and fitted with washers which bear on the end pieces of the sectors so as to allow a tension to be exerted on the keys when the screws are screwed.

7. The transducer according to claim 2, wherein gaps remaining between the tightening keys and the shaper annulus and gaps remaining between the tightening keys and the tightening mechanism are plugged with a filler product.

8. The transducer according to claim 3, wherein gaps remaining between the tightening keys and the shaper annulus and gaps remaining between the tightening keys and the tightening mechanism are plugged with a filler product.

9. The transducer according to claim 2, wherein the dynamic stiffness of the shaper annulus is substantially ten times smaller than that of the piezoelectric segments.

10. The transducer according to claim 3, wherein the dynamic stiffness of the shaper annulus is substantially ten times smaller than that of the piezoelectric segments.

11. The transducer according to claim 4, wherein the dynamic stiffness of the shaper annulus is substantially ten times smaller than that of the piezoelectric segments.

12. A prestressed annular acoustic transducer, comprising:

a set of piezoelectric segments arranged in the form of an annulus, the piezoelectric segments being grouped to form substantially identical sectors;

end pieces fixed to ends of at least selected of the sectors to delimit wedge-shaped gaps between the selected sectors, the narrower ends of the wedge-shaped gaps pointing towards the inside of the annulus;

wedge-shaped tightening keys matched to the wedge-shaped gaps and placed in the wedge-shaped gaps;

a shaper annulus holding the sectors and end pieces;

a tightening mechanism configured to slide the tightening keys towards the inside of the annulus to prestress the segments; and strain gauges fixed to an inside face of the sectors to allow measurement of the tangential stresses applied to the segments;

wherein the tightening mechanism is further configured to be progressively tightened while the readings given by the strain gauges are monitored so as to obtain identical stresses equal to a desired value on each sector.

13. The transducer according to claim 12, wherein the tightening mechanism comprises:

screws fixed in holes made in an inner face of the tightening keys and fitted with washers which bear on the end pieces of the sectors so as to allow a tension to be exerted on the keys when the screws are screwed.

14. The transducer according to claim 13, wherein gaps remaining between the tightening keys and the shaper annulus and gaps remaining between the tightening keys and the tightening mechanism are plugged with a filler product.

15. The transducer according to claim 14, wherein the dynamic stiffness of the shaper annulus is substantially ten times smaller than that of the piezoelectric segments.

* * * * *